No. 759,903. PATENTED MAY 17, 1904.
A. G. MOECKEL.
FILTER FOR RAIN SPOUTS.
APPLICATION FILED FEB. 8, 1904.
NO MODEL.

Inventor
Aratine G. Moeckel.

Witnesses
By R. S. & A. B. Lacey, Attorneys

No. 759,903. Patented May 17, 1904.

UNITED STATES PATENT OFFICE.

ARATINE G. MOECKEL, OF ROCKWALL, TEXAS.

FILTER FOR RAIN-SPOUTS.

SPECIFICATION forming part of Letters Patent No. 759,903, dated May 17, 1904.

Application filed February 8, 1904. Serial No. 192,597. (No model.)

*To all whom it may concern:*

Be it known that I, ARATINE G. MOECKEL, a citizen of the United States, residing at Rockwall, in the county of Rockwall and State of Texas, have invented certain new and useful Improvements in Filters for Rain-Spouts, of which the following is a specification.

This invention provides an improved device in the form of a filtering means to be attached to down-spouts or rain-water pipes of buildings, the essential aim of the invention being to attain a device of this class susceptible of a broad application and which may be very efficiently utilized for the purposes intended.

The invention further aims to provide an overflow for the filtering attachment, whereby the clogging of the strainer may be readily obviated and whereby all foreign matter which may lodge upon this part may be conveyed off.

For a full description of the invention and the merits thereof, and also to acquire a knowledge of the details of construction of the means for effecting the result, reference is to be had to the following description and accompanying drawings.

While the essential and characteristic features of the invention are susceptible of modification, still the preferred embodiment of the invention is illustrated in the accompanying drawings, in which—

Figure 1:
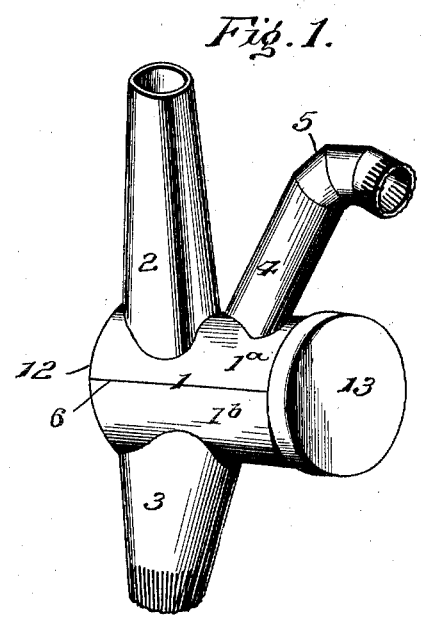
Figure 2:
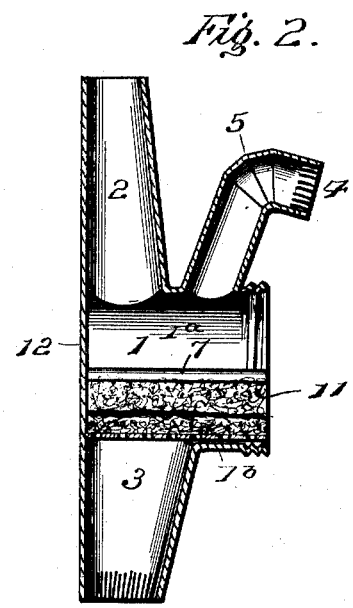
Figure 3:
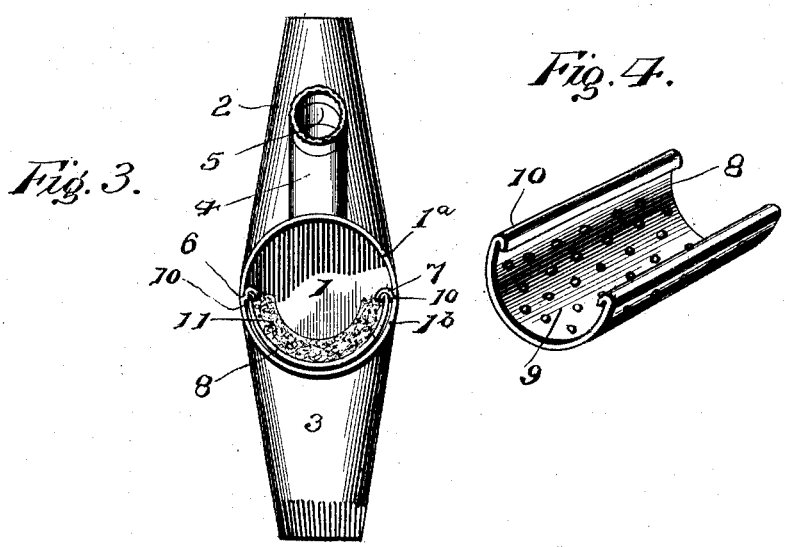
Figure 4:
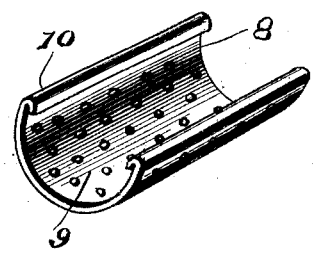

Figure 1 is a perspective view of the invention. Fig. 2 is a vertical sectional view through the filtering attachment, showing more clearly the relative arrangement of parts and the detail construction thereof. Fig. 3 is a front elevation showing the cap of the filtering-chamber removed. Fig. 4 is a detail view of the strainer.

Corresponding and like parts are referred to in the following description and indicated in all the views of the drawings by the same reference characters.

The invention consists of a filtering-chamber 1, horizontally disposed, an inlet-pipe 2, an outlet-pipe 3, and an overflow-pipe 4. The inlet-pipe 2 and the overflow-pipe 4 extend upwardly from the filtering-chamber 1, the overflow-pipe 4 being provided with an elbow 5, to which may be secured a pipe or the like by which foreign matter lodging within the filtering-chamber may be carried off. The filtering-chamber 1 is of a peculiar form, consisting of upper and lower pipe-sections $1^a$ and $1^b$. The pipe-sections $1^a$ and $1^b$ are of approximately semicircular form in cross-section and having their edge portions united, as shown at the seam 6. The lower pipe-section $1^b$ of the filtering-chamber has the edge portions thereof inturned to form flanges 7, the said flanges 7 supporting the strainer 8. The strainer 8 consists, preferably, of a screen 9, which may be of wire-gauze material or the like, the general outline of the strainer 9 being semicylindrical, so as to somewhat conform to the shape of the pipe-section $1^b$ of the filtering-chamber. The upper edge portions of the strainer 9 are inturned or flanged, as shown at 10, the flanged portions 10 being secured to the flanges 7, projected inwardly from the filtering-chamber 1. The strainer screen or plate 9 may be soldered or otherwise substantially secured to the flanges 7 of the pipe-section $1^b$, as will be readily apparent. Upon the screen-plate 9 of the strainer 8 is disposed a layer of textile or absorbent material 11, which insures the efficiency of the filtering operation in a manner obvious. The flanges 10 of the strainer-plate 9 serve not only as supporting-means for said plate with reference to the filtering-chamber, but these flanges coöperate to hold the layer of material 11 properly upon the upper side of said plate. The rear end of the filtering-chamber 1 is permanently closed, as at 12, the outer end, however, being closed by a removable screw-cap 13. The advantage of the use of the screw-cap 13 rests in the fact that should the strainer in the filtering-chamber become so clogged as to overflow or wash through the pipe 5 will not clear same. Ready access may be had to the strainer upon removal of the cap 13. Access may also be had to the strainer by means of removal of the cap 13 for other purposes, such as renewing the filtering material 11 or for work upon the adjacent parts.

The attachment is comparatively simple in structure and may be utilized upon any of the down-spouts now in use, being constructed in sizes to accord with the sizes of pipes to which it may be necessary to apply same.

Having thus described the invention, what is claimed as new is—

In a device of the class described, the combination with a filtering-chamber composed of upper and lower pipe-sections of approximately semicircular form in cross-section and having adjacent edge portions secured together, the lower pipe-section having its edges projected inwardly to form supporting-flanges, a strainer provided with supporting-flanges secured to the supporting-flanges of the filtering-chamber, the filtering-chamber being permanently closed at one end, a removable cap normally closing the opposite end of the filtering-chamber, inlet and overflow pipes leading into the upper pipe-section of the filtering-chamber, and an outlet-pipe leading from the lower pipe-section of said chamber.

In testimony whereof I affix my signature in presence of two witnesses.

ARATINE G. MOECKEL. [L. S.]

Witnesses:
  D. J. ANDERSON,
  H. M. WADE.